United States Patent
Lee et al.

(10) Patent No.: US 8,896,792 B2
(45) Date of Patent: Nov. 25, 2014

(54) LIQUID CRYSTAL DISPLAY DEVICE COMPRISING A REACTIVE MESOGEN THAT FIXES LIQUID CRYSTAL MOLECULES TO FORM A LIQUID CRYSTAL DOMAIN

(75) Inventors: Jae-Young Lee, Yongin (KR); Seong-Jun Lee, Yongin (KR); Yi Li, Yongin (KR); Ju-Yeon Seo, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 565 days.

(21) Appl. No.: 13/046,069

(22) Filed: Mar. 11, 2011

(65) Prior Publication Data

US 2011/0221990 A1 Sep. 15, 2011

(30) Foreign Application Priority Data

Mar. 11, 2010 (KR) .................. 10-2010-0021840

(51) Int. Cl.
    *G02F 1/141* (2006.01)
    *C09K 19/02* (2006.01)
    *G02F 1/1337* (2006.01)

(52) U.S. Cl.
    CPC .... *G02F 1/133707* (2013.01); *G02F 1/133753* (2013.01); *G02F 2001/133726* (2013.01); *G02F 1/133711* (2013.01); *G02F 2001/133776* (2013.01)
    USPC .......................................... 349/136; 349/183

(58) Field of Classification Search
    USPC ...................... 349/41, 93, 106, 153
    See application file for complete search history.

(56) References Cited

U.S. PATENT DOCUMENTS 5,998,101 A 12/1999 Park et al.
6,201,588 B1 3/2001 Walton et al.
(Continued)

FOREIGN PATENT DOCUMENTS

JP 3568862 10/2000
JP 2003114441 4/2003
(Continued)

OTHER PUBLICATIONS

Koike, Yoshio, et al. "Super High Quality MVA-TFT Liquid Crystal Displays." Fujitsu. Sci. Tech. J., 35, 2, pp. 221-228 (Dec. 1999).

(Continued)

*Primary Examiner* — Paul Lee
(74) *Attorney, Agent, or Firm* — Robert E. Bushnell, Esq.

(57) ABSTRACT

A display device that prevents occurrence of a phenomenon where a boundary portion of a pixel region becomes dark, and a method of manufacturing the same. The display device includes a first substrate arrangement including a domain forming layer having a depression pattern for forming a liquid crystal domain in a pixel region, and a pixel electrode arranged on the domain forming layer, a second substrate arrangement including a common electrode arranged on an entire surface facing the first substrate arrangement, a liquid crystal layer arranged between the first and second substrate arrangements and including a plurality of liquid crystal molecules and a reactive mesogen (RM) to fix the liquid crystal molecules to form the liquid crystal domain, a sealant arranged between the first and second substrate arrangements to adhere the first and second substrate arrangement together and a light blocker arranged between the sealant and the liquid crystal layer to block light incident from an external side of the sealant.

17 Claims, 8 Drawing Sheets

(56) References Cited

U.S. PATENT DOCUMENTS

| | | |
|---|---|---|
| 6,407,791 B1 | 6/2002 | Suzuki et al. |
| 6,414,733 B1 | 7/2002 | Ishikawa et al. |
| 7,006,178 B2 | 2/2006 | Lee et al. |
| 7,189,990 B2 | 3/2007 | Kim et al. |
| 2002/0196393 A1* | 12/2002 | Tashiro et al. ............... 349/106 |
| 2005/0219442 A1* | 10/2005 | Yang et al. .................... 349/106 |
| 2007/0095468 A1 | 5/2007 | Kim et al. |
| 2007/0195246 A1 | 8/2007 | Huang |
| 2007/0247561 A1* | 10/2007 | Kim ................................ 349/58 |
| 2008/0068551 A1* | 3/2008 | Lee et al. ...................... 349/144 |
| 2008/0176131 A1 | 7/2008 | Byun et al. |
| 2009/0155631 A1 | 6/2009 | Baek et al. |
| 2009/0174851 A1 | 7/2009 | Chen et al. |
| 2009/0201454 A1* | 8/2009 | Kume et al. ................... 349/129 |
| 2009/0251649 A1 | 10/2009 | Kim et al. |
| 2009/0258285 A1 | 10/2009 | Kim |
| 2009/0284700 A1 | 11/2009 | Kim et al. |
| 2010/0053526 A1* | 3/2010 | Kye et al. ...................... 349/124 |
| 2010/0085519 A1 | 4/2010 | Liao |
| 2010/0098973 A1 | 4/2010 | Lee et al. |
| 2010/0133990 A1 | 6/2010 | Park et al. |

FOREIGN PATENT DOCUMENTS

| | | |
|---|---|---|
| JP | 2007114704 | 5/2007 |
| KR | 10-2001-0007523 A | 1/2001 |
| KR | 10-2005-0038101 A | 4/2005 |
| KR | 20060088230 A | 8/2006 |
| KR | 20070047569 A1 | 5/2007 |
| KR | 1020080025544 | 3/2008 |
| KR | 20080047982 | 5/2008 |
| KR | 20080068266 | 7/2008 |
| KR | 0852172 | 8/2008 |
| KR | 20090063846 | 6/2009 |
| KR | 20090100952 A | 9/2009 |
| KR | 20090108417 | 10/2009 |
| KR | 10-2009-0119059 A | 11/2009 |

OTHER PUBLICATIONS

Korean Notice of Allowance issued Apr. 30, 2012 in connection with Korean Patent Application Serial No. 10-2010-0021840 and Request for Entry of the Accompanying Office Action attached herewith.

Korean Office Action issued on Jun. 22, 2011 by the Korean Industrial Property Office in the corresponding Korean Patent Application No. 10-2010-0021840.

* cited by examiner

LIQUID CRYSTAL DISPLAY DEVICE COMPRISING A REACTIVE MESOGEN THAT FIXES LIQUID CRYSTAL MOLECULES TO FORM A LIQUID CRYSTAL DOMAIN

CLAIM OF PRIORITY

This application makes reference to, incorporates the same herein, and claims all benefits accruing under 35 U.S.C. §119 from an application earlier filed in the Korean Intellectual Property Office on the 11, Mar. 2010 and there duly assigned Serial No. 10-2010-0021840.

BACKGROUND OF THE INVENTION

1. Field of the Invention

The present invention relates to a liquid crystal display device for displaying an image by using liquid crystals and a method of manufacturing the same.

2. Description of the Related Art

Generally, a liquid crystal display panel includes an array substrate on which switching devices for driving each pixel region are formed, a counter substrate facing the array substrate, and a liquid crystal layer disposed between the array substrate and the counter substrate. The liquid crystal display panel displays an image by controlling transmittance of light via a voltage applied to the liquid crystal layer.

Meanwhile, in a patterned vertical alignment (PVA) mode, i.e., a VA mode of operation for a liquid crystal display device, a viewing angle of the liquid crystal display device may be improved by forming a liquid crystal domain by arranging liquid crystal molecules in different directions by using a patterned transparent electrode.

SUMMARY OF THE INVENTION

The present invention provides a display device that prevents occurrence of a phenomenon where a boundary portion of a pixel region becomes dark and a method of manufacturing the same.

According to an aspect of the present invention, a display device includes a first substrate arrangement including a domain forming layer having a depression pattern for forming a liquid crystal domain in a pixel region, and a pixel electrode arranged on the domain forming layer, a second substrate arrangement including a common electrode arranged on an entire surface facing the first substrate arrangement, a liquid crystal layer arranged between the first and second substrate arrangements and including a plurality of liquid crystal molecules and a reactive mesogen (RM) to fix the liquid crystal molecules to form the liquid crystal domain, a sealant arranged between the first and second substrate arrangements to adhere the first and second substrate arrangement together and a light blocker arranged between the sealant and the liquid crystal layer to block light incident from an external side of the sealant.

The light blocker may include a material having a higher refractive index than that of the liquid crystal layer. The light blocker may include an organic material having a higher refractive index than that of the liquid crystal layer. The light blocker may be arranged to surround the liquid crystal layer. The first substrate arrangement may include a switching device that includes a contact electrode electrically connected to the pixel electrode, the depression pattern being arranged on the contact electrode to expose the contact electrode. The first substrate arrangement may further include a storage line, the contact electrode overlapping the storage line. The domain forming layer may include a color filter. At least one depression pattern may be arranged within the pixel region of the first substrate arrangement.

According to another aspect of the present invention, there is provided a method of manufacturing a display device that includes preparing a first substrate arrangement including an organic layer and a pixel electrode arranged on the organic layer, the organic layer having a depression pattern to form a liquid crystal domain of a pixel region, preparing a second substrate arrangement including a common electrode arranged on an entire surface facing the first substrate arrangement, coating a sealant on at least one side of the first and second substrate arrangements, forming a light blocker on one side of the sealant, the light blocker to block light incident from an external side of the sealant, applying a liquid crystal composition between the first and second substrate arrangements, the liquid crystal composition including a plurality of liquid crystal molecules and a plurality of reactive mesogen monomers and forming a liquid crystal layer by irradiating light on the liquid crystal composition arranged between the first and second substrate arrangements while applying a voltage between the pixel electrode and the common electrode.

The light blocker may include a material having a higher refractive index than that of the liquid crystal layer. The light blocker may include an organic material having a higher refractive index than that of the liquid crystal layer. The light blocker may be arranged to surround the liquid crystal layer. The forming of the liquid crystal layer may include applying a first voltage to the common electrode, applying a second voltage lower than the first voltage to the pixel electrode and irradiating light on the first and second substrate arrangements. The sealant may be arranged to surround the light blocker.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
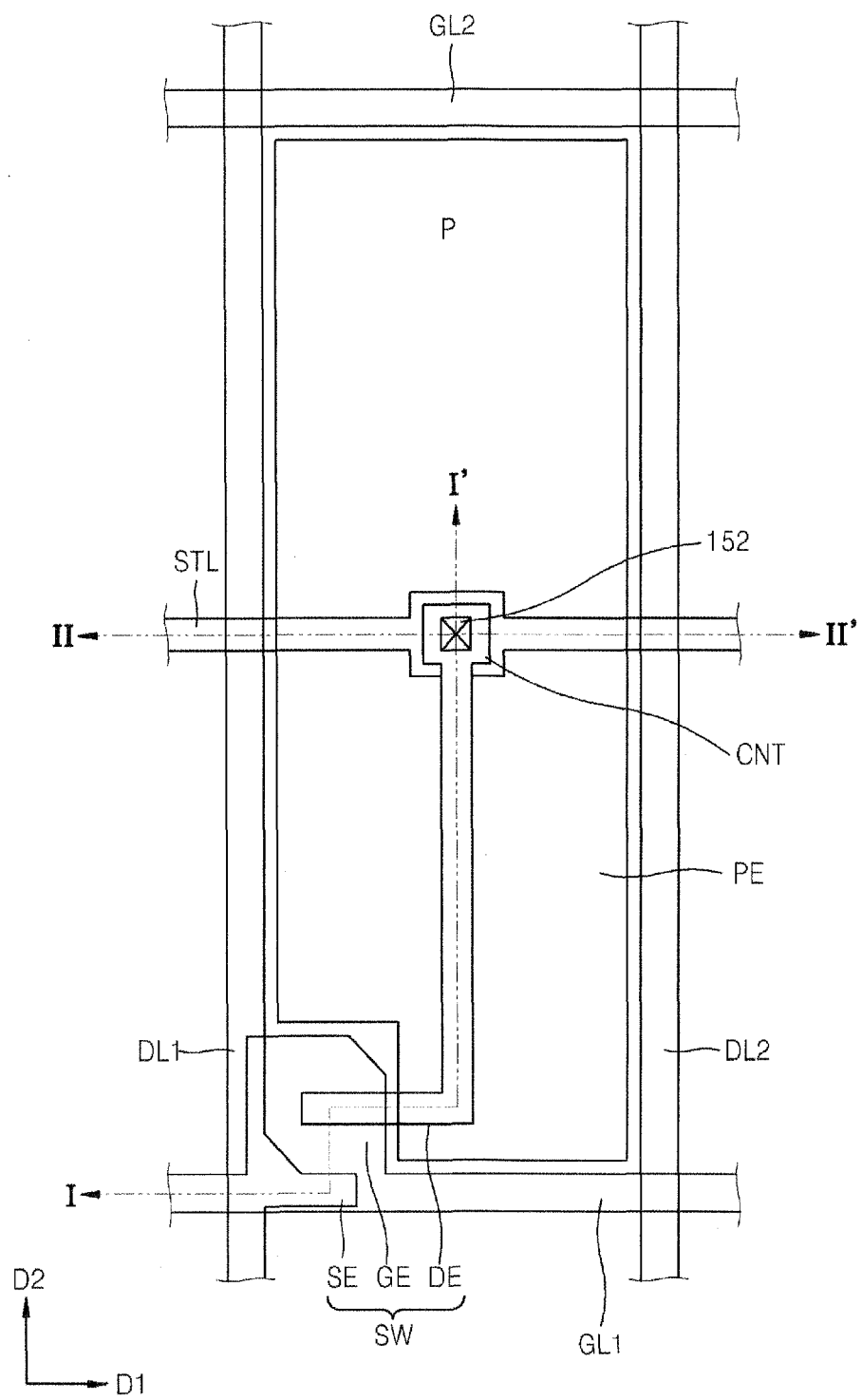
FIG. 1 is a plan view of a display device according to an embodiment of the present invention.
Figure 2A:
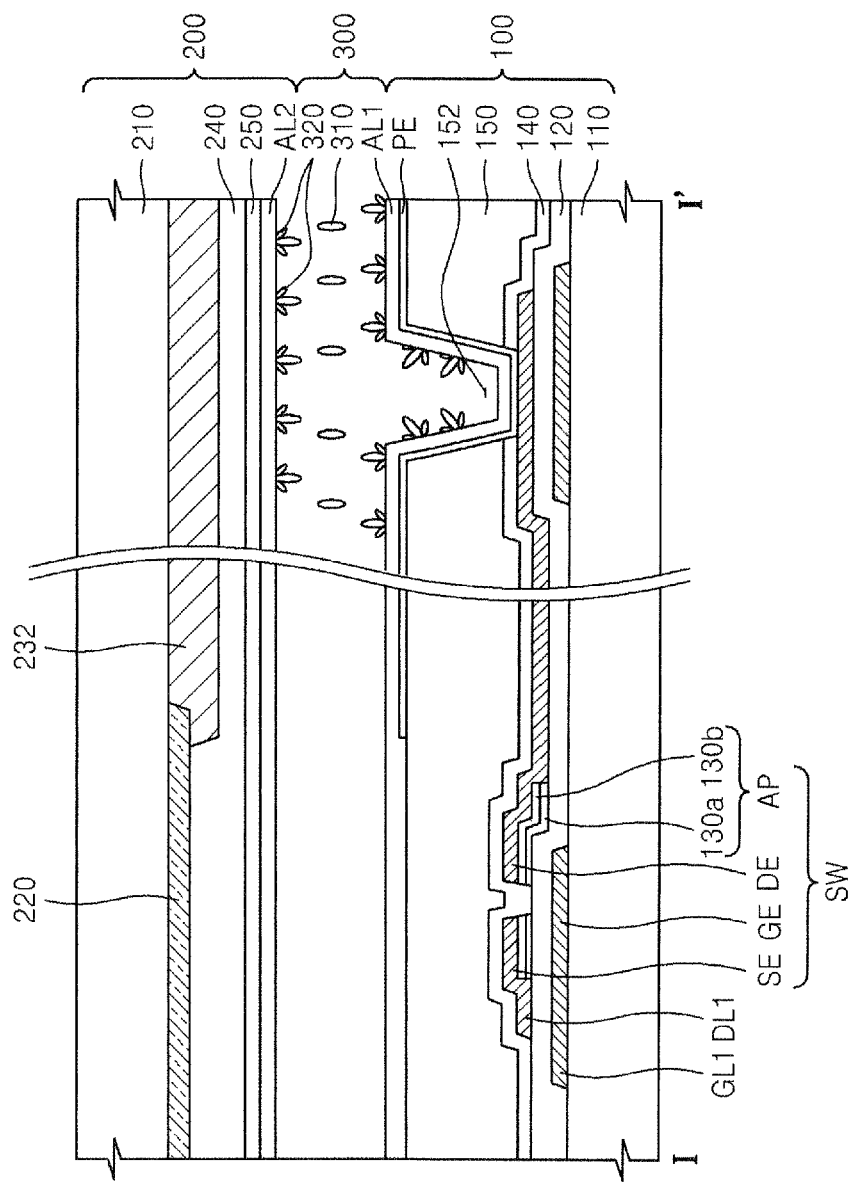
FIG. 2A is a cross-sectional view taken along a line I-I' of FIG. 1.
Figure 2B:
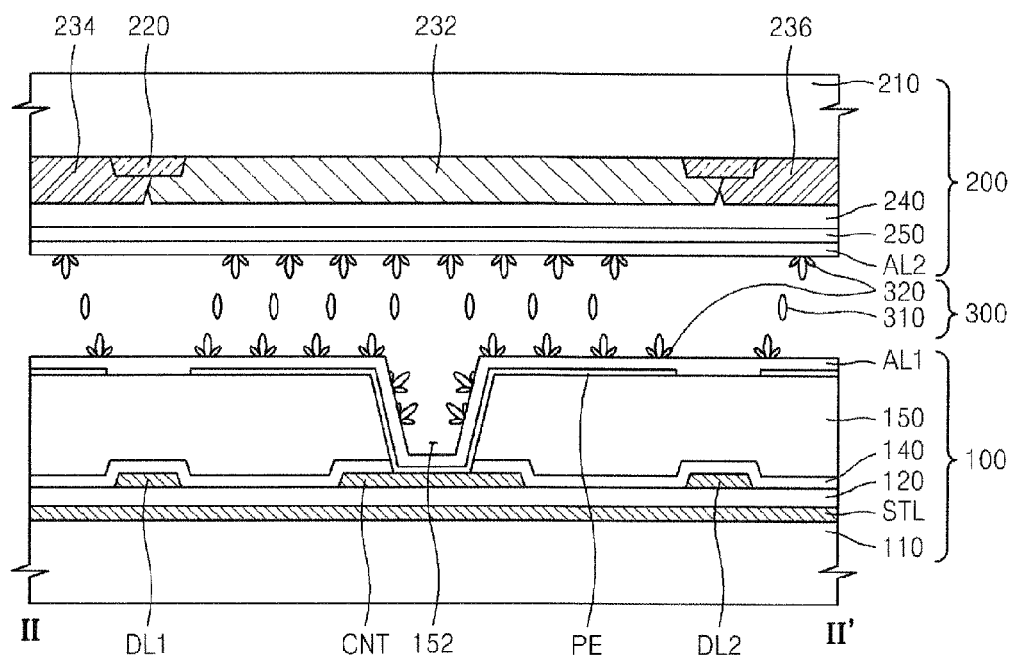
FIG. 2B is a cross-sectional view taken along a line II-II' of FIG. 1.

Hereinafter, the present invention will be described more fully with reference to the accompanying drawings, in which exemplary embodiments of the invention are shown. FIG. 1 is a plan view of a display device according to an embodiment of the present invention, FIG. 2A is a cross-sectional view taken along a line I-I' of FIG. 1, and FIG. 2B is a cross-sectional view taken along a line II-II' of FIG. 1. Liquid crystal layers 300 in FIGS. 2A and 2B include liquid crystal molecules 310 and a reactive mesogen (RM) cured product 320 in a non-electric field, i.e., when no voltage is applied between a pixel electrode PE and a common electrode 250.

Referring to FIGS. 1, 2A, and 2B, the display device according to the current embodiment of the present invention includes a first substrate arrangement 100, a second substrate arrangement 200 and the liquid crystal layer 300. The first substrate arrangement 100 includes a first base substrate 110, first and second gate lines GL1 and GL2, a storage line STL, a gate insulation layer 120, first and second data lines DL1 and DL2, a thin film transistor SW constituting a switching device, a passivation layer 140, a domain forming layer 150, the pixel electrode PE, and a first alignment layer AL1.

The first and second gate lines GL1 and GL2 may extend along a first direction D1 on the first base substrate 110 or may instead be arranged in parallel to each other in a second direction D2 different from the first direction D1. The second direction D2 may be, for example, perpendicular to the first direction D1. The storage line STL is disposed between the first and second gate lines GL1 and GL2 and may extend along the first direction D1. The gate insulation layer 120 is formed on the first base substrate 110 to cover the first and second gate lines GL1 and GL2 and the storage line STL. The first and second data lines DL1 and DL2 may extend along the second direction D2 on the gate insulation layer 120 or may instead be arranged in parallel to each other in the first direction D1. The first and second data lines DL1 and DL2 may respectively cross the first and second gate lines GL1 and GL2 and the storage line STL. In the first substrate arrangement 100, a pixel region P may be defined by the first and second gate lines GL1 and GL2, and the first and second data lines DL1 and DL2. The pixel electrode PE may be formed in the pixel region P.

The thin film transistor SW may include a gate electrode GE connected to the first gate line GL1, an active pattern AP formed on the gate insulation layer 120 so as to correspond to the gate electrode GE, a source electrode SE connected to the first data line DL1 and overlapping the active pattern AP, a drain electrode DE spaced apart from the source electrode SE and overlapping the active pattern AP, and a contact electrode CNT extending from the drain electrode DE to the pixel region P. The contact electrode CNT may extend from the drain electrode DE to the storage line STL to overlap the storage line STL. The active pattern AP may include a semiconductor layer 130a and an ohmic contact layer 130b sequentially stacked on the gate insulation layer 120. The passivation layer 140 may be disposed on the gate insulation layer 120 to cover the first and second data lines DL1 and DL2, the source electrode SE, the drain electrode DE, and the contact electrode CNT.

The domain forming layer 150 may be formed on the passivation layer 140. The domain forming layer 150 may planarize the first substrate arrangement 100. The domain forming layer 150 includes a depression pattern 152 formed in the domain forming layer 150. The depression pattern 152 is formed in the pixel region P, and may form a liquid crystal domain of the pixel region P. The depression pattern 152 may be formed on the domain forming layer 150 in a dot type, may be formed on the contact electrode CNT so as to correspond to the contact electrode CNT and may be formed as a dot type aperture for exposing a part of the contact electrode CNT. Even when the depression pattern 152 is formed in the dot type aperture, leakage of light in an area where the depression pattern 152 is formed may be prevented by the storage line STL and the contact electrode CNT, which are formed below the depression pattern 152. The domain forming layer 150 may be made out of an organic material or an inorganic material. According to another embodiment of the present invention, the domain forming layer 150 may include an organic layer made out of an organic material or and an inorganic layer made out of an inorganic material, and the depression pattern 152 may be formed in the organic or inorganic layer.

The pixel electrode PE is disposed on the domain forming layer 150 and in the pixel region P, may be made out of a transparent conductive material, may be formed to cover the entire depression, pattern 152 and may be electrically connected to the thin film transistor SW by contacting the contact electrode CNT through the depression pattern 152. Because an area of the pixel electrode PE on the depression pattern 152 includes an area of the pixel electrode PE on the inclined surface of the depression pattern 152, with respect to regions having the same area in a plane, an area of the pixel electrode PE on the depression pattern 152 is relatively larger than an area of the pixel electrode PE formed on a flat region of the domain forming layer 150. Accordingly, when an electric field is formed between the first and second substrate arrangements 100 and 200, an intensity of an electric field in an area adjacent to the depression pattern 152 may be relatively higher than an intensity of an electric field in the flat region where the depression pattern 152 is not formed. Lastly, the first alignment layer AL1 may be formed on the entire surface of the first base substrate 110 including the pixel electrode PE.

The second substrate arrangement 200 includes a second base substrate 210 facing the first substrate arrangement 100, a black matrix pattern 220, first through third color filters 232, 234, and 236 an over coating layer 240, the common electrode 250, and a second alignment layer AL2. In the present invention, the over coating layer 240 may be omitted.

The black matrix pattern 220 may be formed on the second base substrate corresponding to areas where the first and second gate lines GL1 and GL2, the first and second data lines DL1 and DL2, and the thin film transistor SW are formed. The first through third color filters 232, 234, and 236 may be formed in areas of the second base substrate 210 defined by the black matrix pattern 220. For example, the first color filter 232 may be formed in an area of the second base substrate 210 corresponding to the pixel region P in which the pixel electrode PE is formed. The second color filter 234 may be formed in the first direction D1 from the first color filter 232, and the third color filter 236 may be formed on an opposite side of the first color filter 232 than that of the second color filter 234, which is in the −D1 direction from first color filter 232. The over coating layer 240 is formed on the second base substrate 210 where the black matrix pattern 220 and the first through third color filters 232, 234, and 236 are formed, and may planarize the second substrate arrangement 200.

The common electrode 250 may be formed on the over coating layer 240. The common electrode 250 may be made out of a transparent conductive material. The common electrode 250 may be formed on the entire surface of the second substrate arrangement 200 without a separate pattern. In other words, the liquid crystal domain of the liquid crystal layer 300 may be formed by the pixel electrode PE that changes an intensity of an electric field via the depression pattern 152 and the common electrode 250 that has no pattern. Lastly, the second alignment layer AL2 is formed on the second base substrate 210 on which the common electrode 250 is formed, and may be formed on the entire surface of the second substrate arrangement 200.

The liquid crystal layer 300 is disposed between the first substrate arrangement 100 and the second substrate arrangement 200, and includes the liquid crystal molecules 310 and the RM cured product 320. The alignment of the liquid crystal molecules 310 is changed by an electric field formed between the pixel electrode PE and the common electrode 250, thereby adjusting transmittance of light. The liquid crystal molecules 310 may have negative dielectric anisotropy.

A major axis of the liquid crystal molecules 310 adjacent to the first substrate arrangement 100 and/or the second substrate arrangement 200 may be arranged perpendicular to the surface of the first base substrate 110 and/or the second base substrate 210 when no voltage is applied between the pixel electrode PE and the common electrode 250. A major axis of the liquid crystal molecules adjacent to the depression pattern 152 may be arranged perpendicular to a surface of a sidewall of the domain forming layer 150 based on the surface of the sidewall of the domain forming layer 150 forming the depression pattern 152.

The RM cured product 320 may be disposed between the liquid crystal molecules 310. The RM cured product 320 may be disposed between the liquid crystal molecules 310 adjacent to the pixel electrode PE and/or the common electrode 250. In detail, the RM cured product 320 may be disposed between the liquid crystal molecules 310 adjacent to the first alignment layer AL1. Also, the RM cured product 320 may be disposed between the liquid crystal molecules 310 adjacent to the second alignment layer AL2.

The RM cured product 320 maintains the liquid crystal molecules 310 adjacent to the first substrate arrangement 100 and/or the second substrate arrangement 200 in a pre-tilt state based on the surface of the first base substrate 110 and/or the second base substrate 210, even when an electric field is not formed between the pixel electrode PE and the common electrode 250. The RM cured product 320 may be formed when RM monomers 330 of FIG. 3F are polymerized by exposure to an external light when the display device is being manufactured.

Figure 2C:
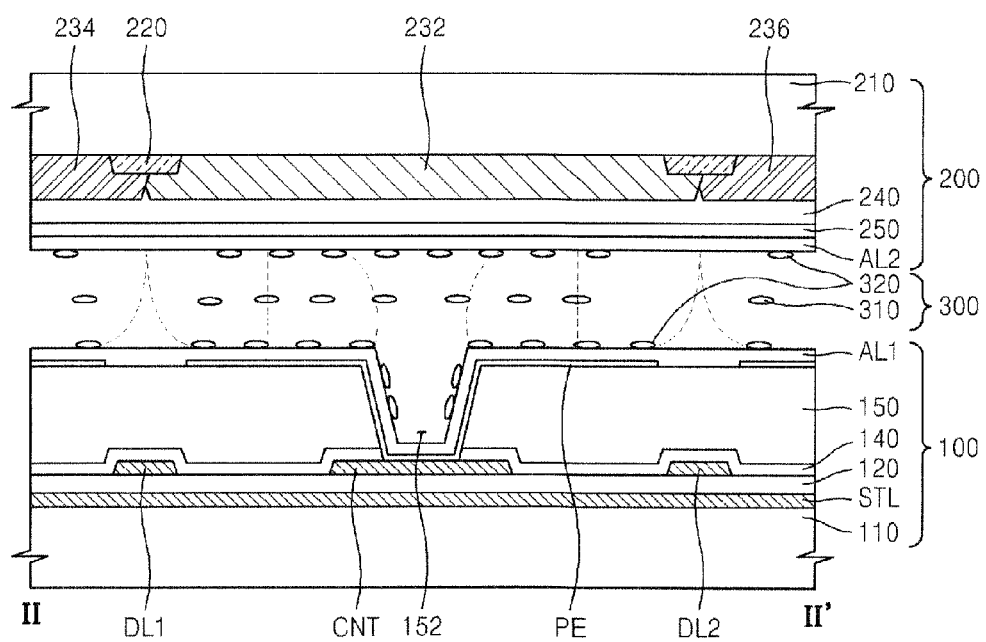
FIG. 2C is a cross-sectional view of the display device of FIG. 2B when a voltage is applied thereto.

FIG. 2C is a cross-sectional view of the display device of FIG. 2B when a voltage is applied thereto. Referring to FIG. 2C, when an electric field is formed between the pixel electrode PE and the common electrode 250, a direction of the electric field inside the pixel region P is in general perpendicular to the surface of the first substrate arrangement 100 and/or the surface of the second substrate arrangement 200.

However, the direction of the electric field bends between an edge of the pixel electrode PE and the common electrode 250. The direction of the electric field also bends between an edge of another pixel electrode adjacent to the pixel electrode PE and the common electrode 250 as indicated by the dotted lines in FIG. 2C. Accordingly, the liquid crystal domain between the adjacent pixel regions P may be divided as the liquid crystal molecules 310 are arranged to emit light toward different points of the common electrode 250 between the adjacent pixel electrodes PE.

An electric field in an area adjacent to the depression pattern 152 has a shape converging toward a point of the common electrode 250, for example, toward an area of the common electrode 250 corresponding to the depression pattern 152, since the electric field pre-tilts the liquid crystal molecules 310 due to sidewalls of the depression pattern 152.

Turning now to FIGS. 3A through 3F, FIGS. 3A through 3F are cross-sectional views for describing a method of manufacturing the display device of FIG. 2B. FIGS. 3A through 3F are cross-sectional views taken along a line II-II' of FIG. 1, and the method will be described with reference to FIGS. 1, 2B and 2C, and 3A through 3F.

Figure 3A:
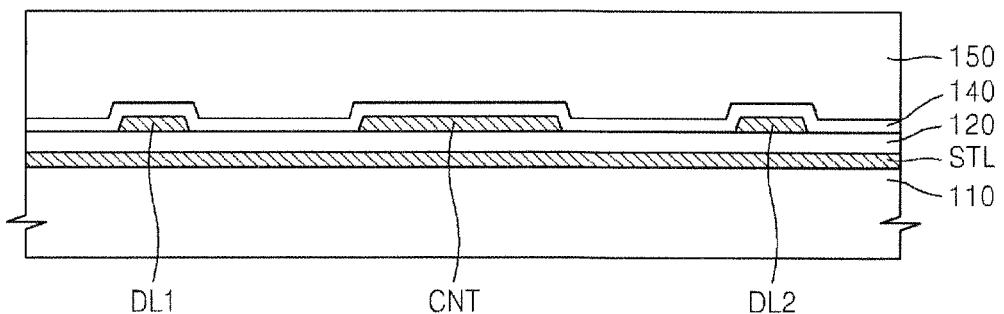
FIGS. 3A through 3F are cross-sectional views for describing a method of manufacturing the display device of FIG. 2B.
Figure 3B:
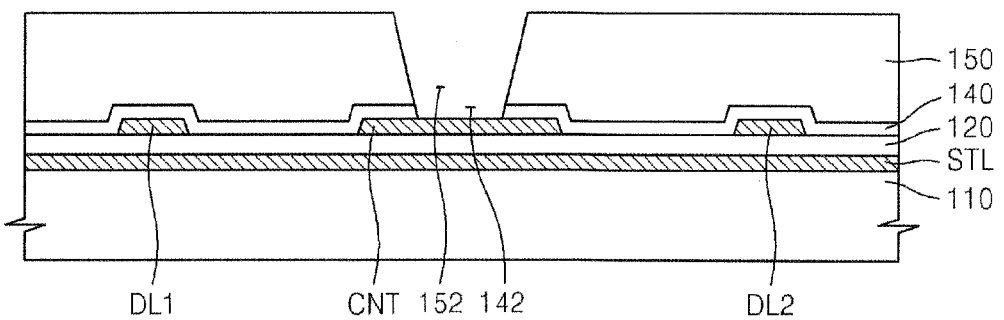
Figure 3C:
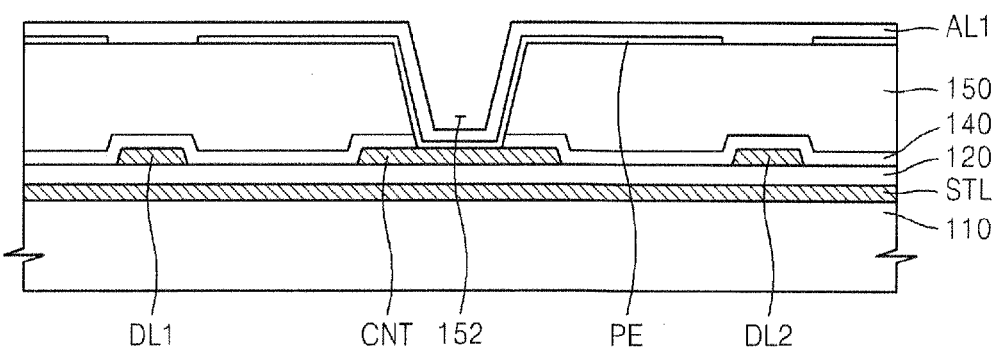

FIGS. 3A through 3C are cross-sectional views for describing a method of preparing the first substrate arrangement 100 of FIG. 2B. Referring to FIG. 3A, a gate metal layer (not shown) is disposed on the first base substrate 110, and the gate metal layer is patterned through a photolithography process to form a gate pattern including the first and second gate lines GL1 and GL2, the gate electrode GE, and the storage line STL.

The gate insulation layer 120 is disposed on the first base substrate 110 on which the gate pattern is formed. The gate insulation layer 120 may be made out of silicon oxide, silicon nitride, or the like.

The active pattern AP is formed on the first base substrate 110 on which the gate insulation layer 120 is disposed. The active pattern AP may include semiconductor layer 130a and ohmic contact layer 130b sequentially disposed on the gate insulation layer 120. The semiconductor layer 130a may include amorphous silicon, and the ohmic contact layer 130b may include amorphous silicon doped with a high purity n-type impurity.

A data metal layer (not shown) is disposed on the first base substrate 110 on which the active pattern AP is formed, and the data metal layer may be patterned through a photolithography process to form a source pattern including the first and second data lines DL1 and DL2, the source electrode SE, the drain electrode DE, and the contact electrode CNT.

The passivation layer 140 and the domain forming layer 150 are sequentially disposed on the first base substrate 110 on which the source pattern is formed. The passivation layer 140 may be made out of silicon oxide, silicon nitride, or the like. Examples of a material used to form the domain forming layer 150 include organic materials, such as a positive type photoresist composition and a negative type photoresist composition, and inorganic materials, such as silicon oxide and silicon nitride. The domain forming layer 150 may include a color filter.

Referring to FIG. 3B, the depression pattern 152 is formed by patterning the domain forming layer 150. The depression pattern 152 may be formed on the contact electrode CNT that may overlap the storage line STL. The depression pattern 152 may be an aperture that exposes the passivation layer 140 on the contact electrode CNT.

Next, a passivation aperture 142 is formed by removing the passivation layer 140 exposed through the depression pattern 152. The passivation aperture 142 is formed on the contact electrode CNT. A part of the contact electrode CNT may be exposed through the passivation aperture 142 and the depression pattern 152.

Referring to FIG. 3C, a transparent electrode layer (not shown) is disposed on the first base substrate 110 including the domain forming layer 150 on which the depression pattern 152 is formed, and the transparent electrode layer is patterned to form the pixel electrode PE. The transparent electrode layer may be made out of indium tin oxide (ITO), indium zinc oxide (IZO), or the like.

Then, the first alignment layer AL1 is disposed on the first base substrate 110 on which the pixel electrode PE is formed. The first alignment layer AL1 may include a vertical alignment material that vertically aligns the liquid crystal molecules 310.

As above, the first substrate arrangement 100 according to the current embodiment of the present invention, including the gate pattern, the gate insulation layer 120, the active pattern AP, the source pattern, the passivation layer 140, the domain forming layer 150 having the depression pattern 152, the pixel electrode PE, and the first alignment layer AL1 may be prepared.

Figure 3D:
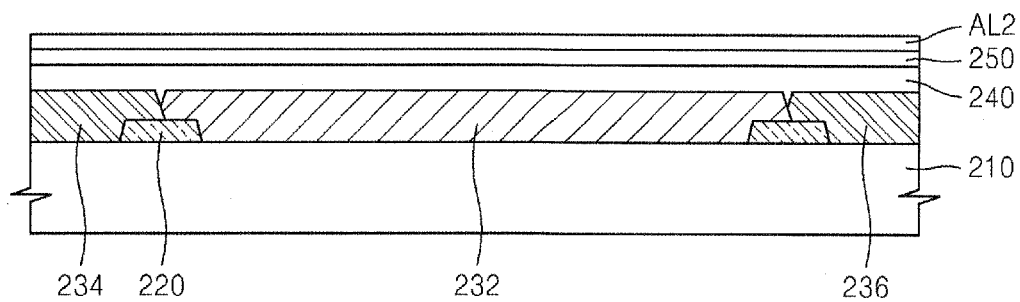

Turning now to FIG. 3D, FIG. 3D is a cross-sectional view for describing a method of preparing the second substrate arrangement 200 of FIG. 2B. Referring to FIG. 3D, the black matrix pattern 220 is formed on the second base substrate 210. The black matrix pattern 220 may be formed by ejecting an organic ink or patterning a metal layer through a photolithography process.

The first through third color filters 232, 234, and 236 are formed on the second base substrate 210 on which the black matrix pattern 220 is formed. For example, the first color filter 232 may be formed, the second color filter 234 may be formed on the second base substrate 210 including the first color filter 232, and the third color filter 236 may be formed on the second base substrate 210 including the first and second color filters 232 and 234. The first through third color filters 232, 234, and 236 may be formed by patterning a color photoresist layer through a photolithography process or by ejecting a color ink.

The over coating layer 240 may be disposed on the second base substrate 210 including the black matrix pattern 220 and the first through third color filters 232, 234, and 236. The over coating layer 240 may be made out of acryl resin. A transparent electrode layer (not shown) may be formed on the second base substrate 210 on which the over coating layer 240 is formed, thereby forming the common electrode 250. The common electrode 250 may be formed to cover the entire surface of the second base substrate 210 without having to pattern the transparent electrode layer. The common electrode 250 may be made out of ITO or IZO. The second alignment layer AL2 may be disposed on the second base substrate 210 on which the common electrode 250 is formed. The second alignment layer AL2 may cover the entire surface of the second base substrate 210 on which the common electrode 250 is formed. Accordingly, the second substrate arrangement 200 according to the current embodiment of the present invention, including the black matrix pattern 220, the first through third color filters 232, 234, and 236, the over coating layer 240, the common electrode 250, and the second alignment layer AL2 may be prepared.

Figure 3E:
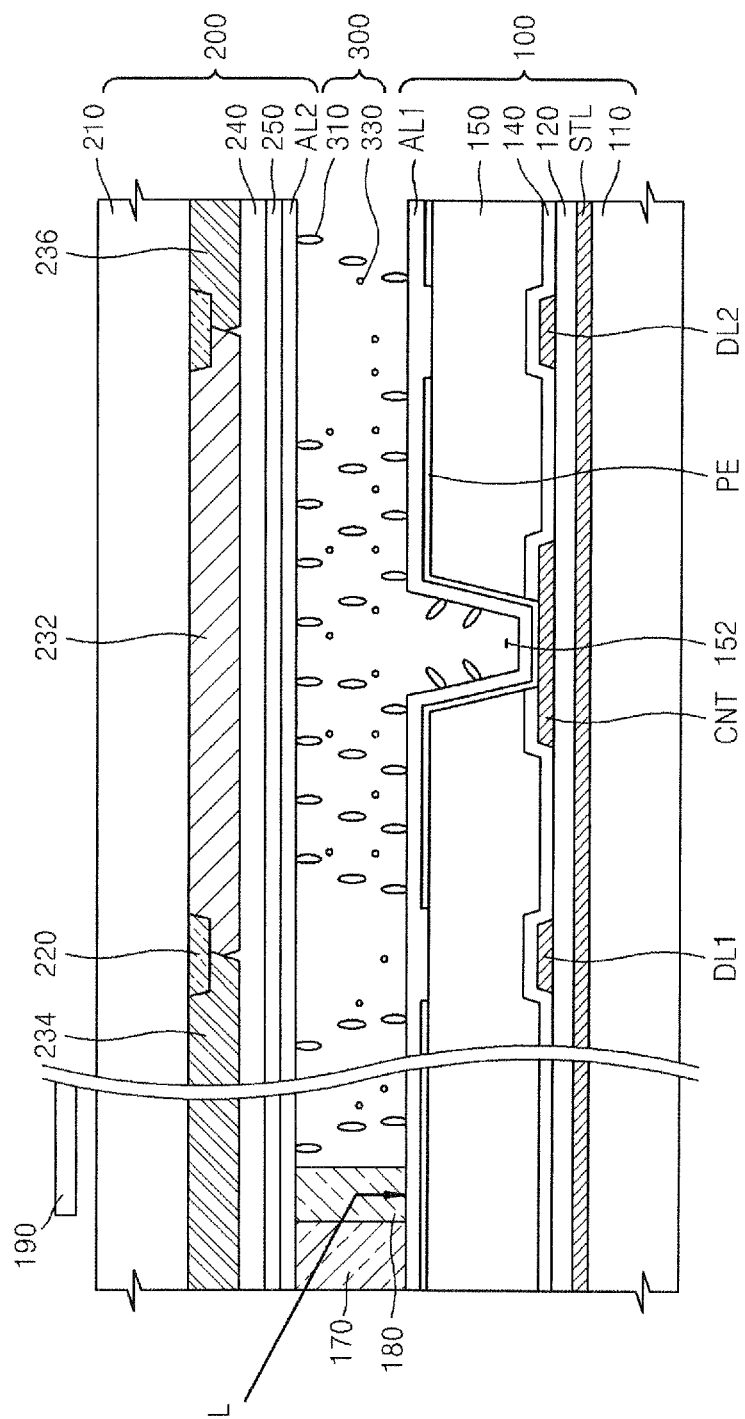
Figure 3F:
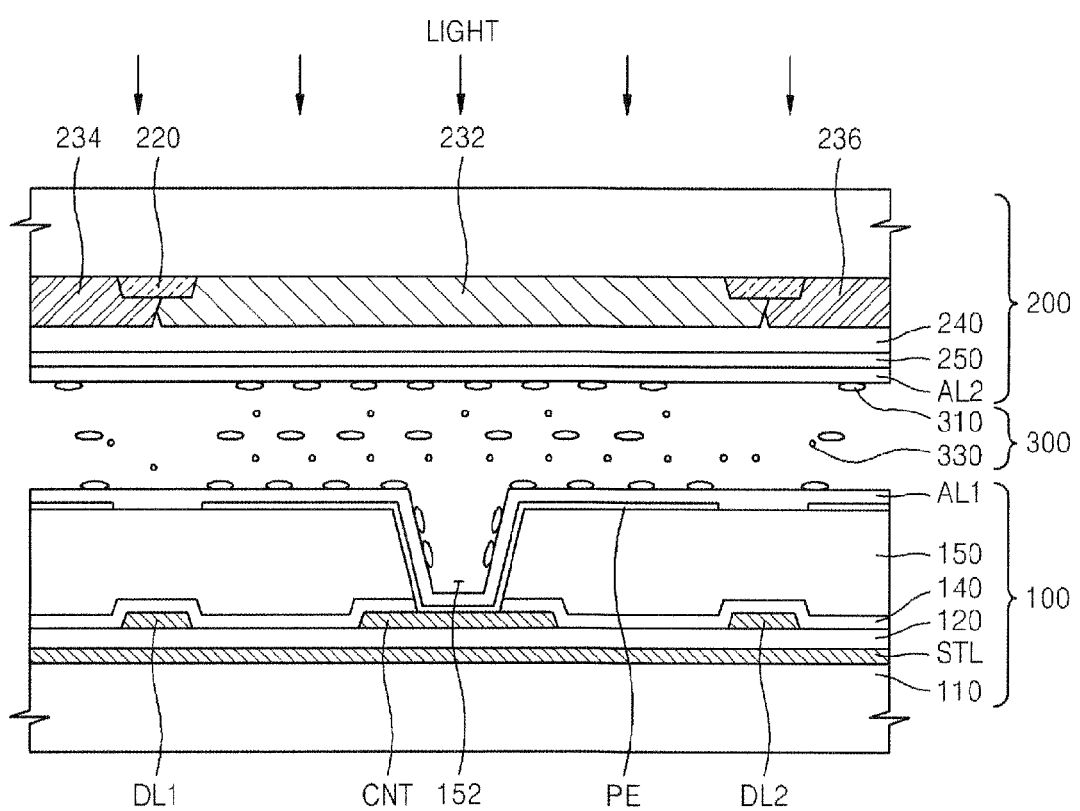

Turning now to FIG. 3E, FIG. 3E is a cross-sectional view for describing a method of assembling the first and second substrate arrangements 100 and 200. Referring to FIG. 3E, a one drop filling (ODF) process is performed to assemble the first and second substrate arrangements 100 and 200. The ODF process is a process of coating a sealant 170 on any one side of the first or second substrate arrangement 100 or 200, dropping liquid crystals on another of the first or second substrate arrangement 100 or 200, and then adhering the first and second substrate arrangements 100 and 200 together and then hardening the sealant 170. By using the ODF process, a process time and an amount of liquid crystals used may be remarkably reduced compared to a conventional process of adhering and hardening first and second substrate arrangements by using a main sealant, injecting liquid crystals via a capillary phenomenon, and then completing the adhesion of the first and second substrate arrangements by using an end sealant.

However, when the ODF process is performed, ultraviolet (UV) rays are irradiated only on an area where the sealant 170 is coated so as to harden the sealant 170. That is, the UV rays are prevented from being irradiated on the liquid crystals by disposing a shield mask 190 on the liquid crystals in the pixel region P. However, even when the shield mask 190 is used, the UV rays irradiated from the side of the sealant 170 cannot be entirely blocked, and thus the liquid crystal layer 300 may be hardened in a vertical state by the UV rays irradiated from the side of the sealant 170. Also, due to such a hardened liquid crystal layer 300 formed at a boundary portion of the pixel region P, the boundary portion may become dark. Accordingly, the UV rays may be replaced by a straight line, but when the straight line is used, a separate optical system needs to be designed, and a manufacturing cost of the display device increases.

Thus, the display device according to an embodiment of the present invention includes a light blocker 180 on one side of the sealant 170 so as to block the UV rays irradiated from the side of the sealant 170. In other words, the amount of the UV rays irradiated from the side of the sealant 170 is minimized by forming a lens using an organic layer having a high refractive index on an external side of the liquid crystal layer 300.

In detail, when the light blocker 180 is formed on the external side of the liquid crystal layer 300 by using an organic layer having a higher refractive index than that of the liquid crystal layer 300, the UV rays irradiated from the side of the sealant 170 are not incident on the pixel region P but are refracted to travel in a thickness direction of the display and are emitted to the outside of the light blocker 180 as indicated by an arrow L of FIG. 3E. As described above, a phenomenon where the boundary portion of the pixel region P becomes dark by hardening of the liquid crystal layer 300 along the boundary portion via UV rays irradiated from the side of the sealant 170 during the ODF process may be prevented.

Turning now to FIG. 3F, FIG. 3F is a cross-sectional view for describing a method of forming the liquid crystal layer 300 of FIG. 2B. Referring to FIG. 3F, the liquid crystal molecules 310 and the RM monomer 330 are disposed between the first and second substrate arrangements 100 and 200. The liquid crystal molecules 310 and the RM monomer 330 may be randomly disposed between the first and second substrate arrangements 100 and 200.

Next, a first voltage Vcom is applied to the common electrode 250, and a second voltage Vdata different from the first voltage Vcom is applied to the pixel electrode PE. When the first voltage Vcom is applied to the common electrode 250 and the second voltage Vdata is applied to the pixel electrode PE, an electric field is formed between the pixel electrode PE and the common electrode 250. When the electric field is formed, the major axis of the liquid crystal molecules 310 is tilted in a direction perpendicular to a direction of the electric field.

The first voltage Vcom may have a higher level than the second voltage Vdata. In detail, the first voltage Vcom may be about 0 V, and the second voltage Vdata may have a negative value. The second voltage Vdata may be, for example, about −5 V.

A light is irradiated on the first and second substrate arrangement 100 and 200 while the liquid crystal molecules 310 are pre-tilted due to the electric field between the first and second substrate arrangements 100 and 200. The light may be, for example, UV rays. The RM monomers 330 may photo-react and be polymerized due to the light, thereby forming the RM cured product 320 disposed between the liquid crystal molecules 310. Accordingly, the liquid crystal layer 300 disposed between the first and second substrate arrangement 100 and 200 according to the current embodiment of the present invention, may be formed.

According to the current embodiment of the present invention, the liquid crystal domain may be formed by the depression pattern 152 of the domain forming layer 150, without having to form a separate pattern in the common electrode 250. Accordingly, an aperture ratio of the pixel region P may be improved, and a viewing angle of the display device may be improved. Also, since the common electrode 250 does not have a separate pattern, misalignment of the first and second substrate arrangements 100 and 200 is completely prevented. In addition, a manufacturing process is simplified by omitting a separate process of patterning the common electrode 250. Accordingly, productivity and display quality of the display device may be improved.

According to the above display device and the method of manufacturing the same, a phenomenon where a boundary portion of a pixel region becomes dark by hardening a liquid crystal layer in the boundary portion via UV rays irradiated from a side of a sealant during an ODF process may be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device, comprising:
    a first substrate arrangement including a domain forming layer having a depression pattern for forming a liquid crystal domain in a pixel region, and a pixel electrode arranged on the domain forming layer;
    a second substrate arrangement including a common electrode arranged on an entire surface facing the first substrate arrangement;
    a liquid crystal layer arranged between the first and second substrate arrangements and including a plurality of liquid crystal molecules and a reactive mesogen (RM) to fix the liquid crystal molecules to form the liquid crystal domain, wherein a major axis of liquid crystal molecules on a sidewall of the depression pattern are perpendicular to a surface of the sidewall of the depression pattern;
    a sealant arranged between the first and second substrate arrangements to adhere the first and second substrate arrangements together; and
    a light blocker arranged between the sealant and the liquid crystal layer to block light incident from an external side of the sealant.

2. The display device of claim 1, wherein the light blocker is comprised of a material having a higher refractive index than that of the liquid crystal layer.

3. The display device of claim 1, wherein the light blocker is comprised of an organic material having a higher refractive index than that of the liquid crystal layer.

4. The display device of claim 1, wherein the light blocker is arranged to surround the liquid crystal layer.

5. The display device of claim 1, wherein the first substrate arrangement comprises a switching device comprising a contact electrode electrically connected to the pixel electrode, the depression pattern being arranged on the contact electrode to expose the contact electrode.

6. The display device of claim 5, wherein the first substrate arrangement further comprises a storage line, the contact electrode overlapping the storage line.

7. The display device of claim 1, wherein the domain forming layer comprises a color filter.

8. The display device of claim 1, wherein at least one depression pattern is arranged within the pixel region of the first substrate arrangement.

9. The display device of claim 1, wherein the depression pattern is arranged at a center of the pixel region.

10. The display device of claim 9, the depression pattern being formed in the domain forming layer and being a dot-type aperture having sidewalls and a bottom.

11. The display device of claim 9, wherein a major axis of liquid crystal molecules at locations other than the depression pattern are arranged perpendicular to a surface of a first base substrate of the first substrate arrangement and a surface of a second base substrate of the second substrate arrangement, and wherein a major axis of liquid crystal molecules on a the sidewall of the depression pattern are perpendicular to a surface of the sidewall of the domain forming layer of the depression pattern.

12. The display device of claim 1, wherein the liquid crystal domain is determined by the depression pattern and not by a pattern in the common electrode or the pixel electrode.

13. The display device of claim 1, wherein when an electric field is formed between the first and second substrate arrangements, an intensity of the electric field in an area adjacent to the depression pattern is relatively higher than an intensity of the electric field in a flat region away from the depression pattern.

14. The display device of claim 1, the common electrode being arranged on an entire surface of the second substrate arrangement and being absent of a separate pattern.

15. The display device of claim 1, the liquid crystal domain is formed by variations in the electric field with location in a vicinity of the depression pattern.

16. The display device of claim 1, the light blocker minimizing an amount of UV rays incident from an external side of the sealant by forming a lens using an organic layer having a high refractive index to refract and transmit said rays to travel in a thickness direction of the display.

17. The display device of claim 1, wherein the first and second substrate arrangements are assembled by a one drop filling process comprising:
    coating the sealant on one of the first and second substrate arrangements;
    dropping a liquid crystal composition including liquid crystal molecules and a reactive mesogen on an other of the first and second substrate arrangements;
    adhering the first and second substrate arrangements together;
    hardening the sealant by exposing the sealant to UV rays while preventing the UV rays from reaching the liquid crystal composition by disposing a shield mask on the liquid crystal composition and by refracting a portion of the UV rays irradiated from a side of the sealant by the light blocker to travel in a thickness direction of the display;
    applying a first voltage to the common electrode and a second and different voltage to the pixel electrode to pre-tilt the liquid molecules; and
    irradiating the first and second substrate arrangements with UV rays while the first and second voltages are being applied to polymerize the reactive mesogen to fix the liquid crystal molecules to their pre-tilt orientation.

* * * * *